(12) United States Patent
Lee et al.

(10) Patent No.: US 7,798,696 B2
(45) Date of Patent: Sep. 21, 2010

(54) ILLUMINATION DEVICE FOR LIQUID CRYSTAL DISPLAY

(75) Inventors: Hong-seok Lee, Yongin-si (KR); Su-mi Lee, Yongin-si (KR); Hwan-Young Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 11/783,682

(22) Filed: Apr. 11, 2007

(65) Prior Publication Data
US 2008/0089092 A1 Apr. 17, 2008

(30) Foreign Application Priority Data
Oct. 16, 2006 (KR) .................. 10-2006-0100382

(51) Int. Cl.
*F21V 7/04* (2006.01)
(52) U.S. Cl. .................. 362/612; 362/606; 362/607; 362/608; 362/609
(58) Field of Classification Search .......... 362/612, 362/606, 609, 610, 615, 626, 613, 607, 608
See application file for complete search history.

(56) References Cited

U.S. PATENT DOCUMENTS

| | | | | |
|---|---|---|---|---|
| 6,139,163 A * | 10/2000 | Satoh et al. | ............... | 362/612 |
| 6,474,826 B1 * | 11/2002 | Tanaka et al. | ............... | 362/612 |
| 6,494,588 B1 * | 12/2002 | Okada | ............... | 362/610 |
| 6,692,134 B2 * | 2/2004 | Ohwada et al. | ............... | 362/603 |
| 6,811,275 B2 * | 11/2004 | Suzuki et al. | ............... | 362/609 |
| 6,883,924 B2 * | 4/2005 | Maeda et al. | ............... | 362/612 |
| 7,101,070 B2 * | 9/2006 | Yu et al. | ............... | 362/558 |
| 7,195,389 B2 * | 3/2007 | Parker et al. | ............... | 362/606 |
| 2003/0012009 A1 * | 1/2003 | Suzuki et al. | ............... | 362/31 |
| 2003/0043567 A1 * | 3/2003 | Hoelen et al. | ............... | 362/31 |
| 2003/0142507 A1 * | 7/2003 | Sugiyama | ............... | 362/551 |
| 2006/0092619 A1 * | 5/2006 | Hsu et al. | ............... | 362/26 |
| 2006/0109684 A1 * | 5/2006 | Nesterenko et al. | ............... | 362/610 |
| 2006/0164857 A1 * | 7/2006 | Morejon et al. | ............... | 362/555 |
| 2007/0189036 A1 * | 8/2007 | Chen et al. | ............... | 362/613 |

(Continued)

FOREIGN PATENT DOCUMENTS

JP 11231321 A 8/1999

(Continued)

*Primary Examiner*—Sandra L O'Shea
*Assistant Examiner*—Evan Dzierzynski
(74) *Attorney, Agent, or Firm*—Sughrue Mion, PLLC

(57) ABSTRACT

An illumination device for a liquid crystal display (LCD) is provided, including: a flat light guide plate having a light exit surface; at least one linear source unit integrally formed with a side of the flat light guide plate and extending along the at least one side of the flat light guide plate; one or more point light sources emitting light through at least one of the side surfaces of the linear light source unit; and a plurality of light exit holes vertically passing through the flat light guide plate and arranged in a longitudinal direction of the linear light source unit between the light exit surface of the flat light guide plate and the linear light source unit, wherein each of the light exit holes has a reflective surface that totally reflects light incident on the linear light source unit into the flat light guide plate.

21 Claims, 14 Drawing Sheets
(2 of 14 Drawing Sheet(s) Filed in Color)

U.S. PATENT DOCUMENTS

2007/0217181 A1*  9/2007  Chiu et al. .................... 362/26
2007/0274100 A1*  11/2007  Yang et al. .................. 362/615
2008/0007964 A1*  1/2008  Lin ............................ 362/602

FOREIGN PATENT DOCUMENTS

JP         2003121652 A       4/2003
WO    WO 2005024477 A1 *   3/2005

* cited by examiner

ILLUMINATION DEVICE FOR LIQUID CRYSTAL DISPLAY

CROSS-REFERENCE TO RELATED PATENT APPLICATIONS

This application claims priority from Korean Patent Application No. 10-2006-0100382, filed on Oct. 16, 2006, in the Korean Intellectual Property Office, the disclosure of which is incorporated herein in its entirety by reference.

BACKGROUND OF THE INVENTION

1. Field of the Invention

Apparatuses consistent with the present invention relate to an illumination device used for a liquid crystal display (LCD), and more particularly, to an illumination device having a linear light source unit that is integrally formed with a flat light guide plate and emits linear light using point light sources such as light-emitting diodes (LEDs).

2. Description of the Related Art

Liquid crystal displays (LCDs) are widely used because of their light weight and low power consumption. Since LCDs, which are light receiving flat displays, cannot emit light by themselves, the LCDs use external light to produce an image. Accordingly, LCDs require illumination devices such as backlight units or front light units.

Illumination devices used for LCDs are classified according to the arrangement of light sources as either direct light or edge light types. Direct light types are configured such that a plurality of lamps are installed under a liquid crystal panel and directly emit light onto the liquid crystal panel. Edge light types are configured such that a lamp is installed at a side of a flat light guide plate and light emitted by the lamp is transmitted through the flat light guide plate to a liquid crystal panel.

Edge light type illumination devices may use linear light sources or point light sources. Cold cathode fluorescent lamps (CCFLs) are typical linear-light sources, and light-emitting diodes (LEDs) are typical point light sources. With recent progress in thin display technology, many illumination devices using thin, high-efficiency point light sources have been developed.

FIG. 1 is a cross-sectional view of a related art LCD. FIG. 2 is a perspective view of a related art backlight unit of the related art LCD of FIG. 1.

Referring to FIGS. 1 and 2, the related art LCD employs the related art backlight unit as an illumination device for emitting light to a liquid crystal panel 10. The backlight unit is disposed behind the liquid crystal panel 10. The backlight unit includes one or more LEDs 40, for example four LEDs, as point light sources, and a flat light guide plate 30 emitting light incident from the LEDs 40 to the liquid crystal panel 10. In detail, the four LEDs 40 are disposed along a side of the flat light guide plate 30 at predetermined intervals, and light emitted from the four LEDs 40 enters the light guide plate 30 through a light incident surface 31 of the flat light guide plate 30. The traveling path of the light entering the flat light guide plate 30 is changed by optical path changing means, for example, a dot print pattern 35, which is disposed on a bottom surface of the flat light guide plate 30, such that the light entering the flat light guide plate 30 is emitted through a light exit surface 33 of the flat light guide plate 30. The light emitted from the light exit surface 33 of the flat light guide plate 30 passes through a diffusion sheet 21, prism sheets 22 and 23, and/or a protector 24, and reaches the liquid crystal panel 10. Instead of the dot print pattern 35, a hologram pattern, a reverse prism pattern, or a reverse trapezoidal pattern may be used as the optical path changing means. A reflective plate 50 may be disposed behind the flat light guide plate 30 to reflect light from the back of the flat light guide plate 30.

FIG. 3A is a photograph illustrating luminance distribution on the light exit surface 33 of the related art backlight unit of FIG. 2. FIG. 3B is a graph illustrating luminance distribution measured along line A-A' of FIGS. 2 and 3A.

Referring to FIGS. 3A and 3B, the related art backlight unit constructed as described above has a drawback in that the radiation angle of light emitted from the LEDs 40 is limited. Accordingly, although the plurality of LEDs 40 are used, there are regions where light beams emitted from the LEDs 40 overlap as well as regions where the light beams never reach. For this reason, referring to FIGS. 3A and 3B, the luminance distribution of light emitted from the light exit surface 33 of the flat light guide plate 30 is not uniform, and the irregularity is particularly noticeable near the light incident surface 31 of the flat light guide plate 30. That is, more dark and/or bright lines are found near the light incident surface 31 of the flat light guide plate 30.

The regions with the non-uniform luminance distribution in the flat light guide plate 30 of the related art backlight unit do not contribute to illumination of the liquid crystal panel 10.

SUMMARY OF THE INVENTION

Exemplary embodiments of the present invention provide an illumination device for an LCD, which can be easily manufactured and can improve luminance uniformity of light emitted from a light exit surface of a flat light guide plate by integrally forming a linear light source unit, which emits linear light using point light sources, such as light-emitting diodes (LEDs), with the flat light guide plate.

Exemplary embodiments of the present invention also provide an illumination device for an LCD, the illumination device comprising: a flat light guide plate having a light exit surface; at least one linear source unit integrally formed with at least one side of the flat light guide plate and extending along the at least one side of the flat light guide plate; at least one point light source emitting light through at least one of the side surfaces of the linear light source unit into the linear light source unit; and a plurality of light exit holes vertically passing through the flat light guide plate and arranged in a longitudinal direction of the linear light source unit between the light exit surface of the flat light guide plate and the linear light source unit, wherein each of the light exit holes has a reflective surface that totally reflects light incident on the linear light source unit into the flat light guide plate.

The point light sources may be LEDs. The point light sources may face both the side surfaces of the linear light source unit. Each of the point light sources may be tilted at a predetermined angle with respect to a longitudinal axis of the linear light source unit.

Each of the point light sources may have a thickness greater than that of the linear light source unit, and a coupling which tapers from the point light source to the linear light source unit may be installed between the point light source and the linear light source unit.

The reflective surface of each of the plurality of light exit holes may be inclined at a predetermined angle, or may be curved. Each of the plurality of light exit holes may have a triangular shape, or a trapezoidal shape.

Any one selected from the group consisting of a prism pattern, a lens pattern, a scattering pattern, and a diffraction grating pattern may be formed on a side surface of the linear light source unit facing the plurality of light exit holes.

The illumination device may further comprise a frame covering and protecting the linear light source unit, the point light sources, and the plurality of light exit holes. The frame may have an inner reflective surface that reflects light leaking from the linear light source unit back into the linear light source unit. Any one selected from the group consisting of a prism pattern, a lens pattern, a scattering pattern, and a diffraction grating pattern may be formed on the inner reflective surface of the frame.

The prism pattern may include a plurality of prisms extending in the longitudinal direction or a thickness direction of the linear light source unit. The lens pattern may include a plurality of lenses extending in the longitudinal direction or a thickness direction of the linear light source unit.

Optical path changing means for changing the traveling path of light incident from the linear light source unit and emitting the light through the light exit surface may be formed on the flat light guide plate. The optical path changing means may be any one selected from the group consisting of a dot print pattern, a hologram pattern, a reverse prism pattern, and a reverse trapezoidal pattern.

Two linear light source units may be formed on two opposite sides of four sides of the flat light guide plate.

Four linear light source units may be formed on four sides of the flat light guide plate.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other exemplary aspects and advantages of the present invention will become more apparent by the following detailed description of exemplary embodiments thereof with reference to the attached drawings in which:

FIG. 14A.

DETAILED DESCRIPTION OF EXEMPLARY EMBODIMENTS OF THE INVENTION

Figure 1:
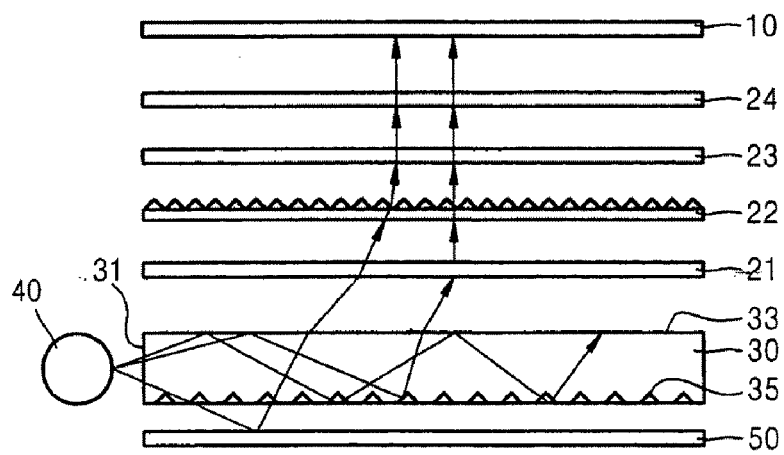
FIG. 1 is a cross-sectional view of a related art LCD.
Figure 2:
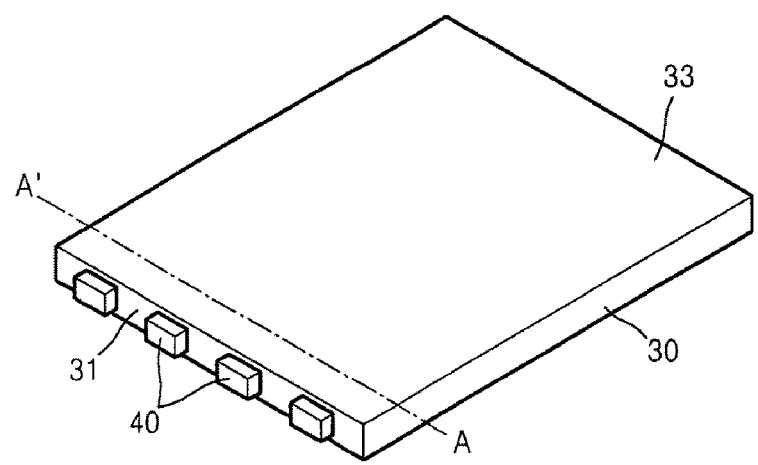
FIG. 2 is a perspective view of a related art backlight unit of the related art LCD of FIG. 1.
Figure 3A:
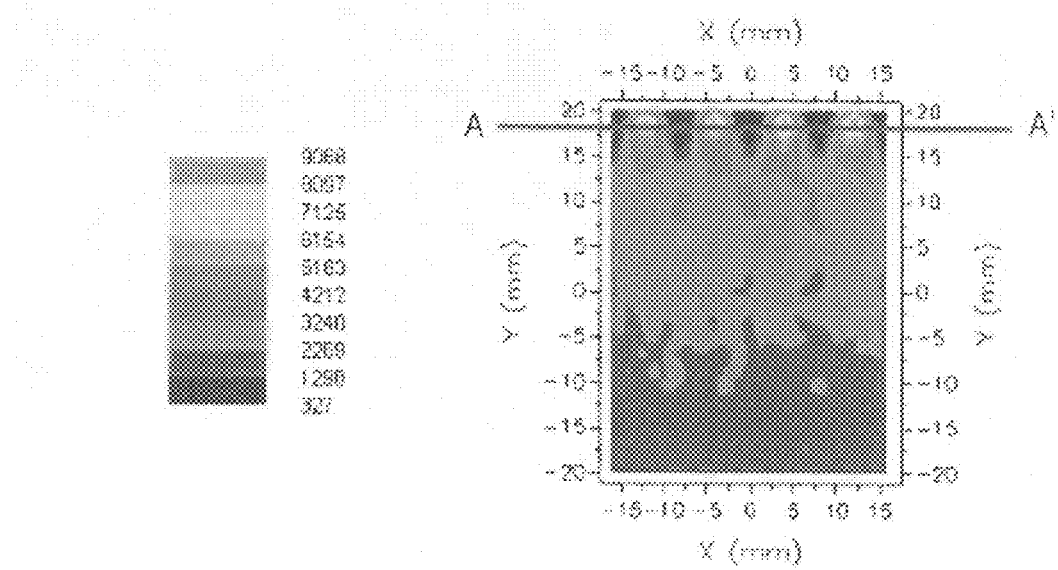
FIG. 3A is a photograph illustrating luminance distribution on a light exit surface of the related art backlight unit of FIG. 2.
Figure 3B:
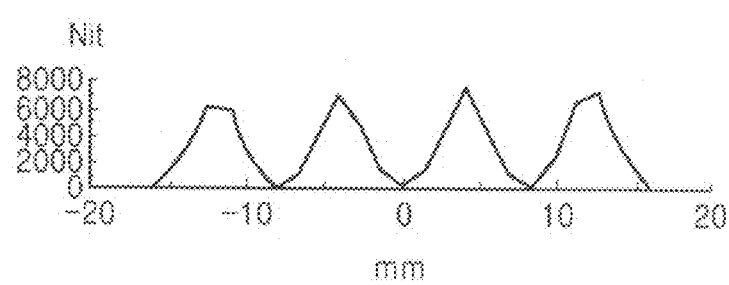
FIG. 3B is a graph illustrating luminance distribution measured along line A-A' of FIGS. 2 and 3A.

The present invention will now be described more fully with reference to the accompanying drawings, in which exemplary embodiments of the invention are shown. Like reference numerals denote like elements in the drawings.

Figure 4:
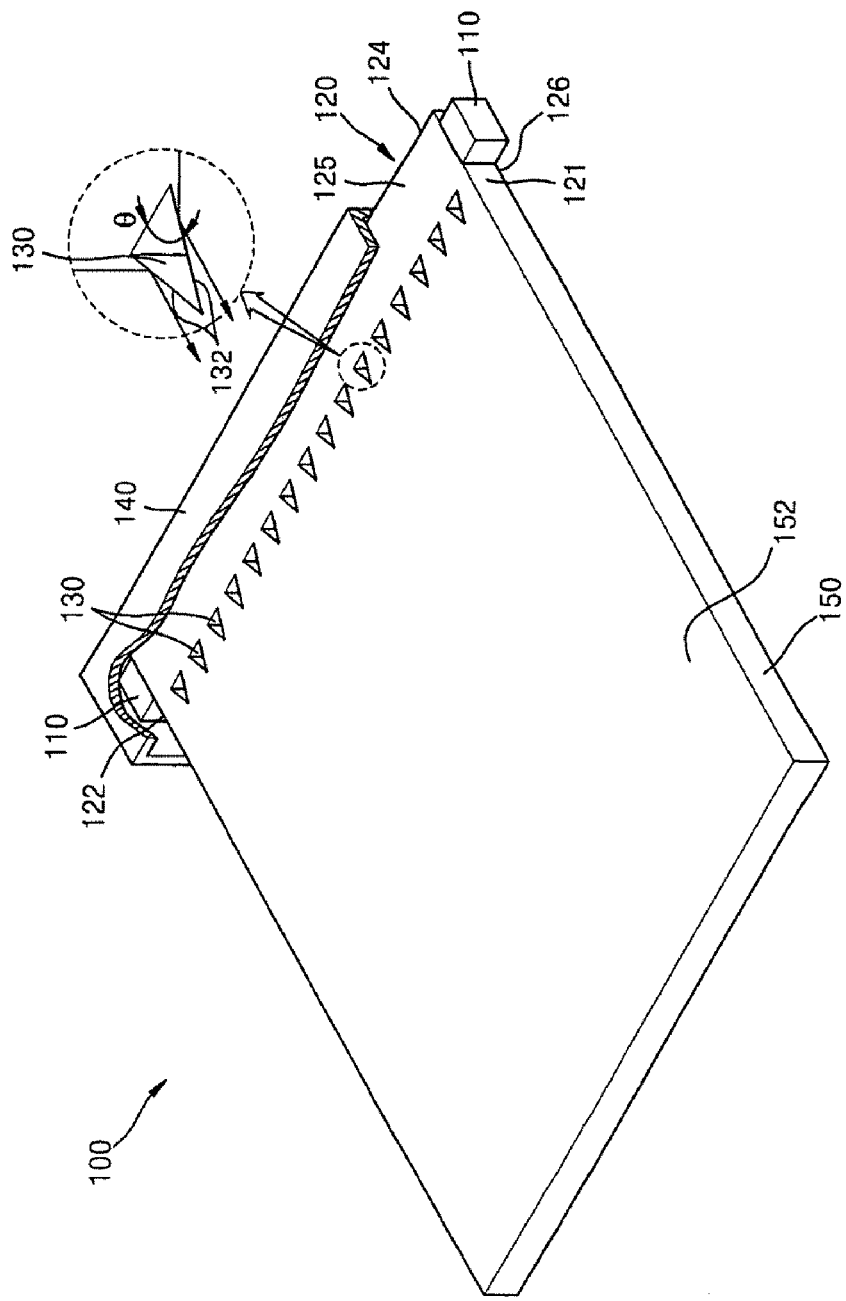
FIG. 4 is a perspective view of an illumination device according to an exemplary embodiment of the present invention.
Figure 5:
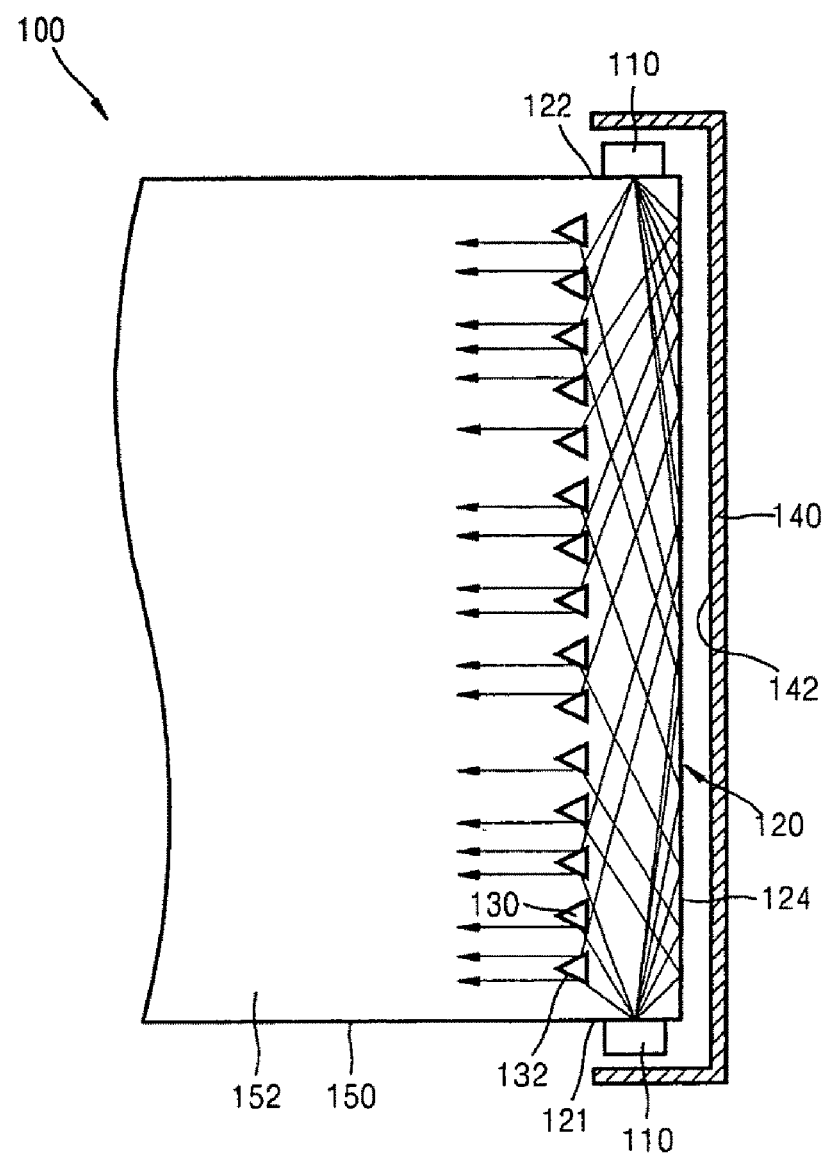
FIG. 5 is a plan view of the illumination device of FIG. 4.
Figure 6:
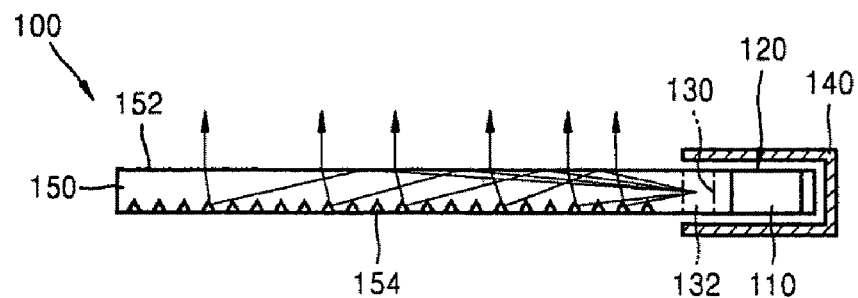
FIG. 6 is a side view of the illumination device of FIG. 4.

FIG. 4 is a perspective view of an illumination device 100 according to an exemplary embodiment of the present invention. FIG. 5 is a plan view of the illumination device 100 of FIG. 4. FIG. 6 is a side view of the illumination device 100 of FIG. 4.

Referring to FIGS. 4 through 6, the illumination device 100 is a backlight unit or a front light unit used for an LCD. The illumination device 100 includes a flat light guide plate 150 having a light exit surface 152, a linear light source unit 120 integrally formed with one side of the flat light guide plate 150, one or more point light sources 110 which emit light into the linear light source unit 120, and a plurality of light exit holes 130 formed between the light exit surface 152 of the flat light guide plate 150 and the linear light source unit 120.

The flat light guide plate 150 has a thin rectangular parallelepiped shape, and the light exit surface 152 of the flat light guide plate 150 has a rectangular shape and allows light to be emitted therethrough toward a liquid crystal panel of the LCD.

Since the linear light source unit 120, which emits linear light into the flat light guide plate 150, is integrally formed with the one side of the flat light guide plate 150, the risk of light scattering between the linear light source unit 120 and the flat light guide plate 150 can be prevented, and the illumination device 100 can be easily manufactured. Since the linear light source unit 120 extends along the one side of the flat light guide plate 150, the linear light source unit 120 has a bar shape with a predetermined width, the same length as the length of the one side of the flat light guide plate 150, and the same thickness as the thickness of the flat light guide plate 150.

The point light sources 110 may be light-emitting diodes (LEDs). The LEDs 110 face both side surfaces 121 and 122 of the linear light source unit 120, such that light is emitted through both the side surfaces 121 and 122 into the linear light source unit 120. The side surfaces 121 and 122 of the linear light source unit 120 form ends of both opposite side surfaces of the flat light guide plate 150. However, the LEDs 110 may be disposed on only one of the two side surfaces 121 and 122 of the linear light source unit 120.

The plurality of light exit holes 130 vertically pass through the flat light guide plate 150, and are arranged in a longitudinal direction of the linear light source unit 120 between the light exit surface 152 of the flat light guide plate 150 and the linear light source unit 120. Each of the plurality of light exit holes 130 has a reflective surface 132 that totally reflects light incident on the linear light source unit 120 into the flat light guide plate 150.

The reflective surface 132 of each of the plurality of light exit holes 130 is inclined at a predetermined angle Θ. Each of the light exit holes 130 may have a triangular shape. The inclination angle Θ of the reflective surface 132 may vary according to the angular distribution of light incident from the LEDs 110 and the desired distribution of light emitted toward the flat light guide plate 150. The inclination angle Θ of the reflective surface 132 may be 54.5 degrees so that incident light with the greatest intensity can be totally reflected by the reflective surface 132 in a direction perpendicular to the longitudinal direction of the linear light source unit 120. The inclination angles Θ of the reflective surfaces 132 of the plurality of light exit holes 130 may all have the same value or may have different values. The plurality of light exit holes 130 may be arranged in the longitudinal direction of the linear light source unit 120 at regular or irregular intervals. Also, the plurality of light exit holes 130 may have different sizes. Accordingly, the angular distribution of light incident from the LEDs 110 and the distribution of light reflected by the reflective surfaces 132 of the plurality of light exit holes 130 into the light guide plate 150 can be controlled by adjusting the inclination angles Θ of the reflective surfaces 132 of the plurality of light exit holes 130, the intervals between the plurality of light exit holes 130, and the sizes of the plurality of light exit holes 130.

The illumination device 100 may further include a frame 140 protecting the linear light source unit 120, the LEDs 110, and the plurality of light exit holes 130. The frame 140 may cover a top surface 125, a bottom surface 126, and both the side surfaces 121 and 122, and a side surface 124, which faces the plurality of light exit holes 130, of the linear light source unit 120. An inner surface of the frame 140 facing the side surface 124 of the linear light source unit 120 may be a reflective surface 142 that reflects light escaping from the linear light source unit 120 back into the linear light source unit 120.

Referring to FIGS. 5 and 6, light emitted from the LEDs 110 is introduced through both the side surfaces 121 and 122 of the linear light source unit 120 into the linear light source unit 120. The light introduced into the linear light source unit 120 is totally reflected by the reflective surfaces 132 of the plurality of light exit holes 130 into the flat light guide plate 150. Some of the light escaping from the side surface 124 of the linear light source unit 120 is reflected by the reflective surface 142 of the frame 140 back into the linear light source unit 120.

Accordingly, the light reflected by the reflective surfaces 134 of the plurality of light exit holes 130 is introduced as linear light into the flat light guide plate 150. The traveling path of the light introduced into the flat light guide plate 150 is changed by optical path changing means, for example, a dot print pattern 154, formed on a bottom surface of the flat light guide plate 150, such that the light introduced into the flat light guide plate 150 is emitted through the light exit surface 152 of the flat light guide plate 150. The light emitted through the light exit surface 152 of the flat light guide plate 150 passes through a diffusion sheet, a prism sheet, and/or a protector and reaches the liquid crystal panel of the LCD. However, instead of the dot print pattern 154, the optical path changing means of the flat light guide plate 150 may be a hologram pattern, a reverse prism pattern, or a reverse trapezoidal pattern. A reflective plate (not shown) may be disposed behind the flat light guide plate 150 to reflect light transmitted through the flat light guide plate 150.

When compared with a related art illumination device, the illumination device 100 of the present embodiment does not directly use point light emitted from the LEDs 110 but uses linear light transformed from the point light emitted from the LEDs 110. Accordingly, as for the illumination device 100 according to the present embodiment, the distribution of light directed into the flat light guide plate 150 from the linear light source unit 120 is uniform, and the luminance distribution of light emitted through the light exit surface 152 of the flat light guide plate 150 is also uniform. This will be explained with reference to experimental results below.

Figure 7A:
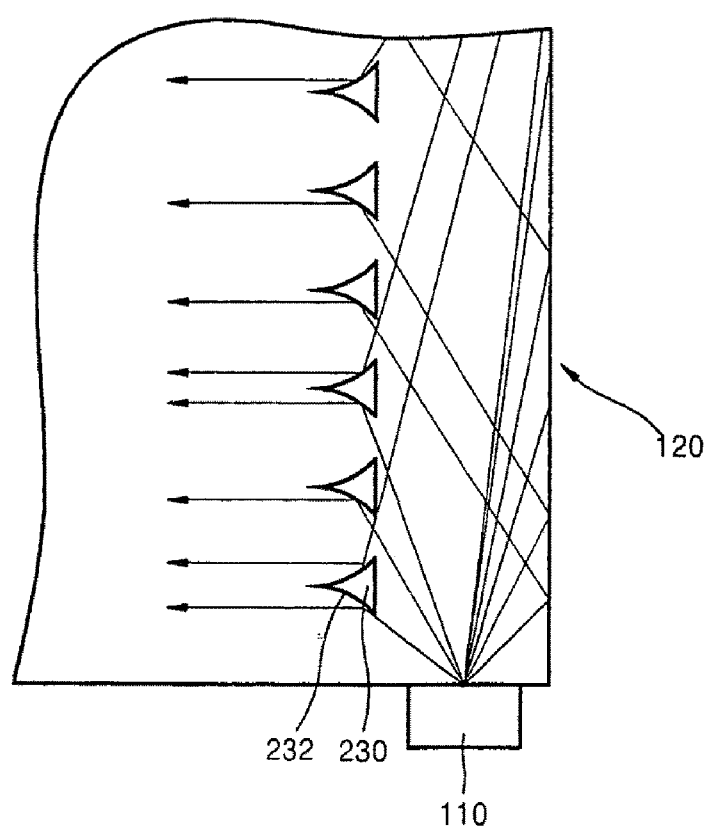
FIGS. 7A and 7B are plan views illustrating modifications of light exit holes of the illumination device of FIG. 4.
Figure 7B:
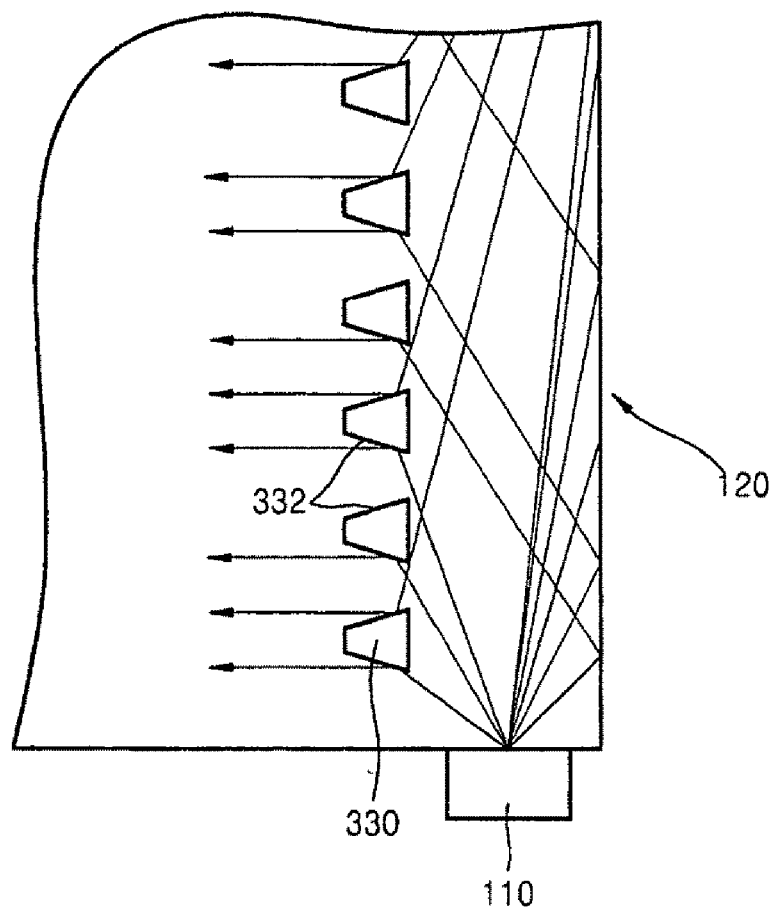

FIGS. 7A and 7B are plan views illustrating modifications of the light exit holes 130 of the illumination device 100 of FIG. 4.

Referring to FIG. 7A, each of a plurality of light exit holes 230 has a reflective surface 232. The reflective surface 232 may be curved, not inclined at a predetermined angle. Referring to FIG. 7B, each of a plurality of light exit holes 330 may have a trapezoidal shape, instead of a triangular shape.

Figure 8:
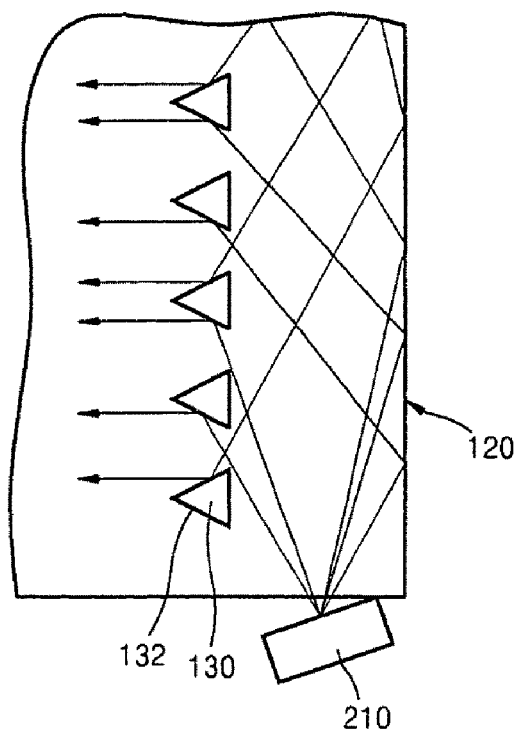
FIG. 8 is a plan view illustrating a modification of point light sources of the illumination device of FIG. 4.
Figure 9:
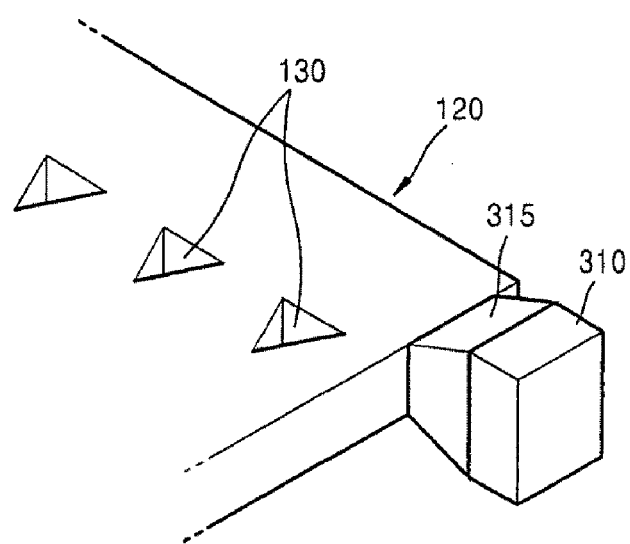
FIG. 9 is a perspective view illustrating another modification of the point light sources of the illumination device of FIG. 4.

FIG. 8 is a plan view illustrating a modification of the point light sources 110 of the illumination device 100 of FIG. 4. FIG. 9 is a perspective view illustrating another modification of the point light sources 110 of the illumination device 100 of FIG. 4.

Referring to FIG. 8, point light sources 210, for example, LEDs, may be tilted at a predetermined angle with respect to a longitudinal axis of the linear light source unit 120. In this case, a central part of light emitted from the LEDs 210 can be used more efficiently.

Referring to FIG. 9, point light sources 310, for example, LEDs, may have a thickness greater than that of the linear light source unit 120. In this case, a coupling 315 may be installed between each of the LEDs 310 and the linear light source unit 120 to guide light emitted from the LED 310 to the linear light source unit 120. The coupling 315 may taper from the LED 310 toward the linear light source unit 120. Accordingly, light emitted from a thicker LED 310 can be incident without loss on the thinner linear light source unit 120.

FIGS. 10A through 10E are perspective views illustrating modifications of the linear light source unit 120 of the illumination device 100 of FIG. 4. FIG. 11 is a perspective view illustrating a modification of the frame 140 of the illumination device 100 of FIG. 4.

Figure 10A:
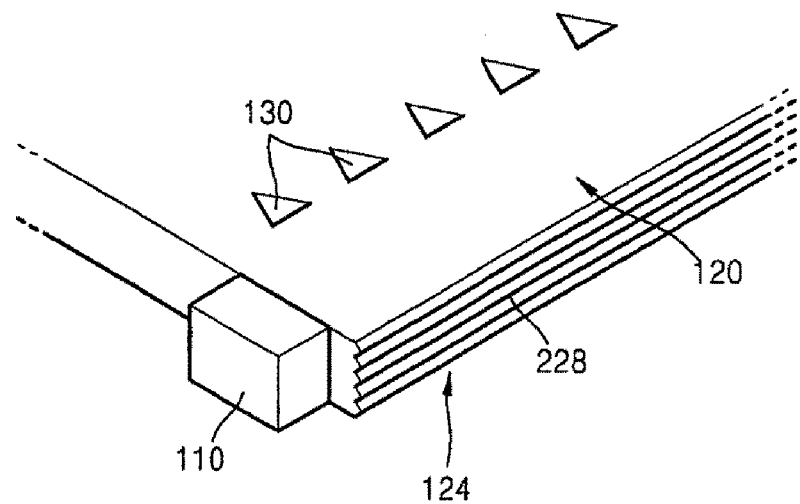
FIGS. 10A through 10E are perspective views illustrating modifications of a linear light source unit of the illumination device of FIG. 4.
Figure 10B:
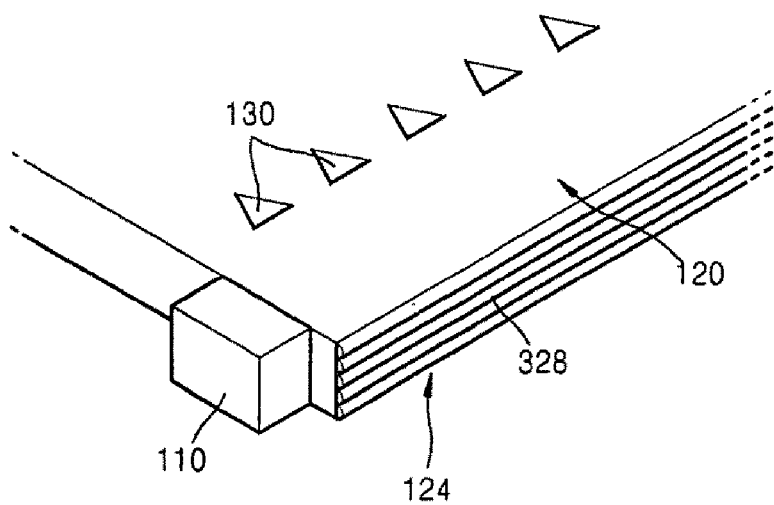
Figure 10C:
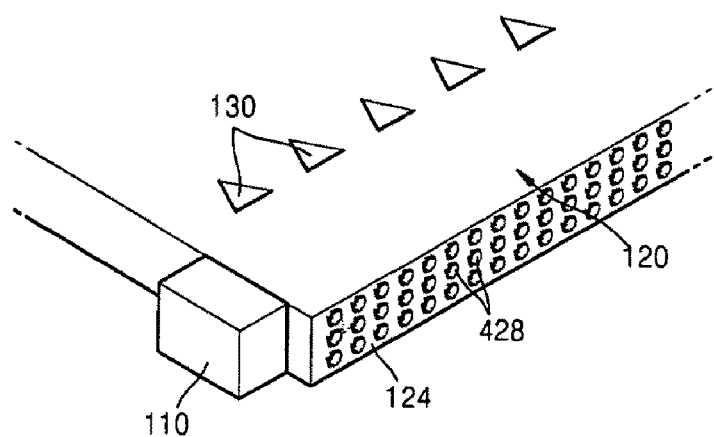
Figure 10E:
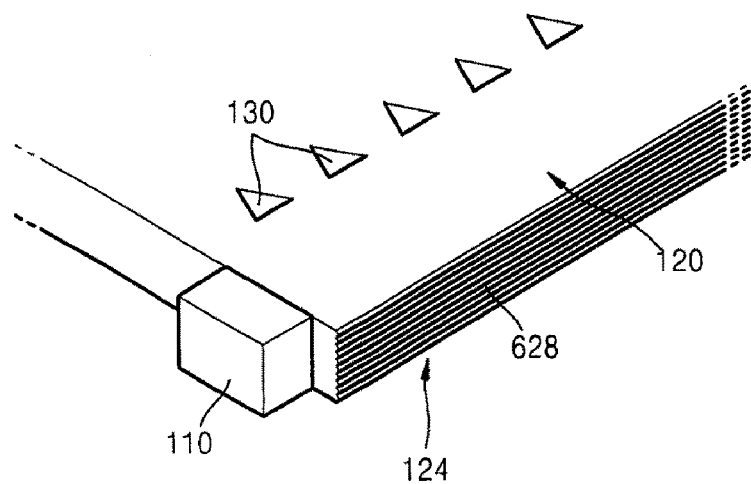
Figure 11:
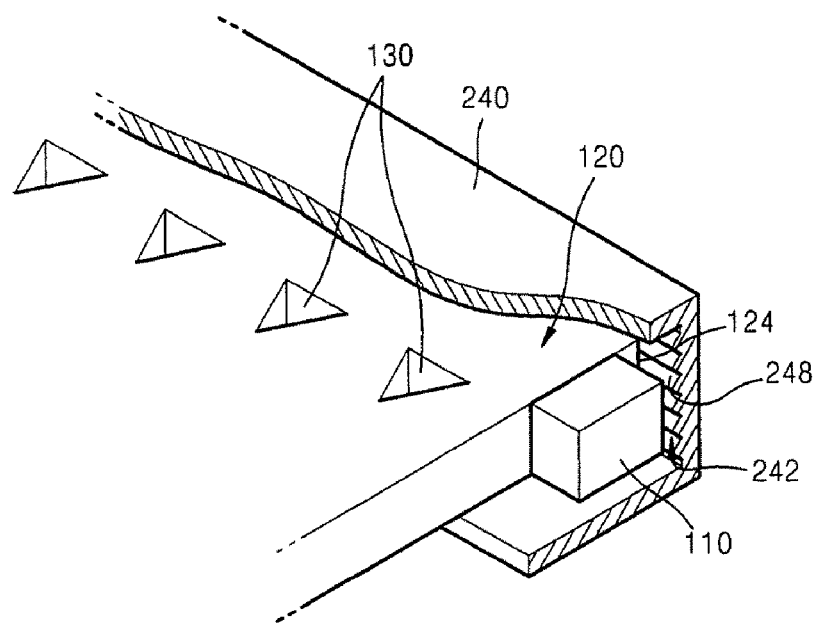
FIG. 11 is a perspective view illustrating a modification of a frame of the illumination device of FIG. 4.

Referring to FIG. 10A, a prism pattern 228 is formed on the side surface 124 of the linear light source unit 120 facing the plurality of light exit holes 130. The prism pattern 228 may include a plurality of prisms extending in the longitudinal direction of the linear light source unit 120. Referring to FIG. 10B, a lens pattern 328 may be formed on the side surface 124 of the linear light source unit 120. The lens pattern 328 may include a plurality of lenses extending in the longitudinal direction of the linear light source unit 120. Referring to FIG. 10C, a scattering pattern 428 may be formed on the side surface 124 of the linear light source unit 120. Referring to FIG. 10E, a diffraction grating pattern 628 is formed on the side surface 124 of the linear light source unit 120.

The vertical angular distribution of light reflected by the side surface 124 of the linear light source unit 120 can be controlled by the prism pattern 228, the lens pattern 328, the scattering pattern 428, or the diffraction grating pattern 628, which are respectively shown in FIGS. 10A through 10C, and 10E.

Figure 10D:
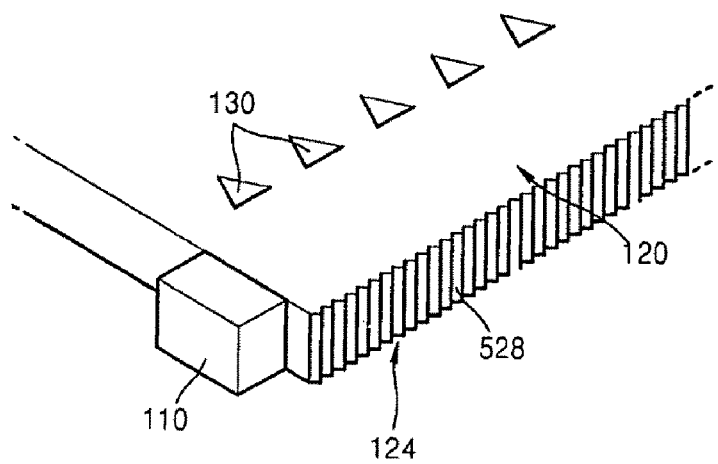

Referring to FIG. 10D, a prism pattern 528 may be formed on the side surface 124 of the linear light source unit 120, and may include a plurality of prisms extending in a thickness direction of the linear light source unit 120. The horizontal angular distribution of light reflected by the side surface 124 of the linear light source unit 120 can be controlled by the prism pattern 528.

The prism pattern 228 or 528, the lens pattern 328, the scattering pattern 428, or the diffraction grating pattern 628 may be formed on the frame 240 (see FIG. 11), rather than on the side surface 124 of the linear light source unit 120. For example, referring to FIG. 11, the prism pattern 248 including the plurality of prisms extending in the longitudinal direction of the linear light source unit 120 may be formed on an inner reflective surface 242 of the frame 240 facing the side surface 124 of the linear light source unit 120. The vertical angular distribution of light reflected by the reflective surface 242 of the frame 240 can be controlled by the prism pattern 248.

As described above, the distribution of light directed from the linear light source unit 120 into the light guide plate 150 can be optimized to improve luminance efficiency by controlling the vertical and horizontal angular distributions of light using the prism pattern 228, 248, or 528, the lens pattern 328, the scattering pattern 428, or the diffraction grating pattern 628 formed on the side surface 124 of the linear light source unit 120 or on the inner reflective surface 242 of the frame 240.

Figure 12:
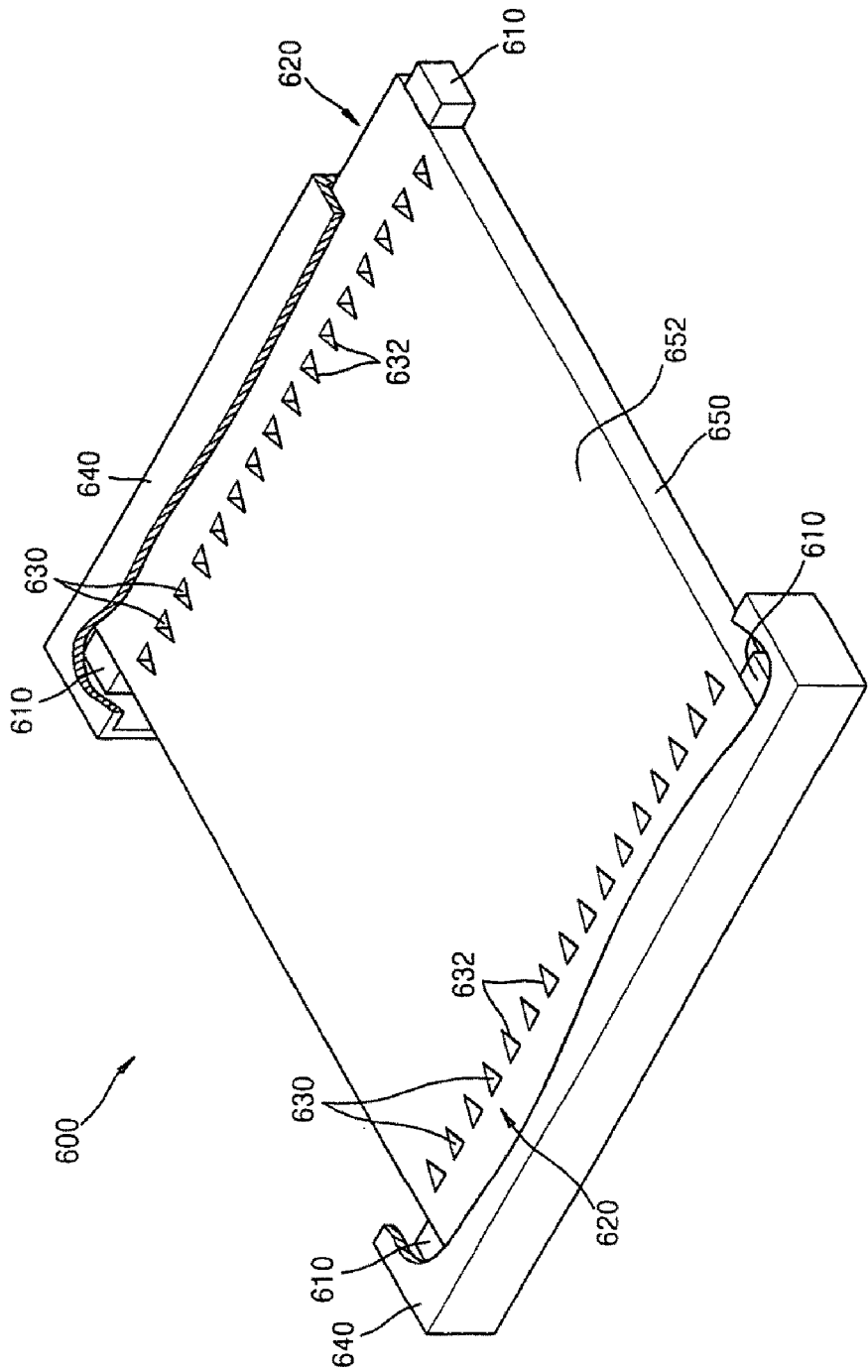
FIG. 12 is a perspective view of an illumination device according to another exemplary embodiment of the present invention.
Figure 13:
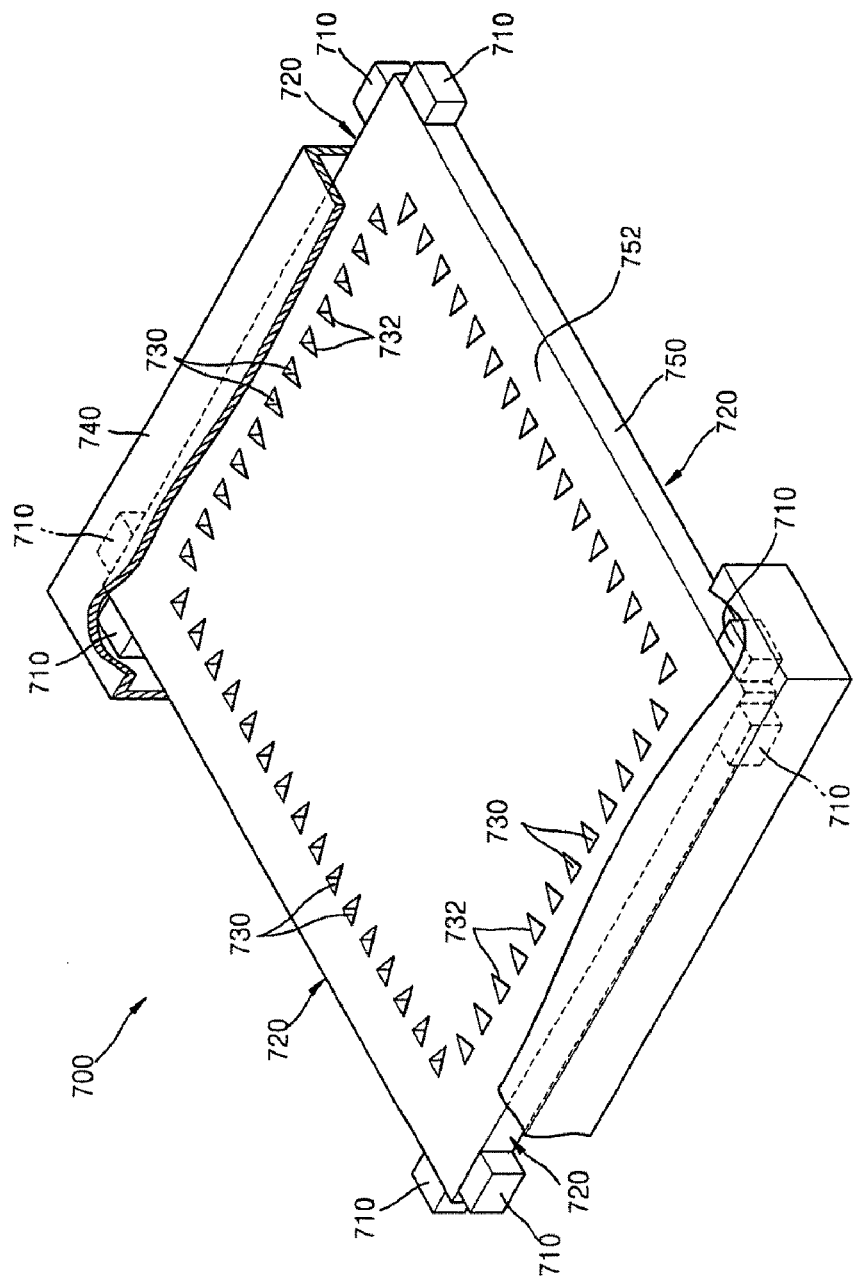
FIG. 13 is a perspective view of an illumination device according to another exemplary embodiment of the present invention.

FIG. 12 is a perspective view of an illumination device 600 according to another embodiment of the present invention. FIG. 13 is a perspective view of an illumination device 700 according to another exemplary embodiment of the present invention.

Referring to FIG. 12, the illumination device 600 includes a flat light guide plate 650 having a light exit surface 652, linear light source units 620 formed on two facing sides of four sides of the flat light guide plate 650, point light sources 610, for example, LEDs, emitting light into the linear light source units 620, and a plurality of light exit holes 630 respectively formed between the light exit surface 652 of the flat light guide plate 650 and the two linear light source units 620.

The linear light sources 620 are integrally formed with the flat light guide plate 650, and extend along the two opposite sides of the flat light guide plate 650. The LEDs 610 may respectively face both side surfaces of each of the two linear light source units 620. The plurality of light exit holes 630 vertically pass through the flat light guide plate 650, and are arranged in a longitudinal direction of the linear light source units 620 between the light exit surface 652 of the flat light guide plate 650 and each of the two linear light source units 620. Each of the plurality of light exit holes 630 has a reflective surface 632 that totally reflects light incident on the linear light source unit 620 into the flat light guide plate 650.

The illumination device 600 may further include frames 640 protecting the linear light source units 620, the LEDs 610, and the plurality of light exit holes 630. The frames 640 may be installed on the two opposite sides of the flat light guide plate 650 on which the linear light source units 620 are formed.

Referring to FIG. 13, the illumination device 700 includes a flat light guide plate 750 having a light exit surface 752, linear light source units 720 formed on four sides of the flat light guide plate 750, point light sources 710, for example, LEDs, emitting light into the linear light source units 720, and a plurality of light exit holes 730 respectively formed between the light exit surface 752 of the flat light guide plate 750 and the four linear light source units 720.

The linear light source units 720 are integrally formed with the flat light guide plate 750, and extend along the four sides of the flat light guide plate 750. The LEDs 710 may respectively face both side surfaces of each of the four linear light source units 720. The plurality of light exit holes 730 vertically pass through the flat light guide plate 750, and are respectively arranged in a longitudinal direction of the linear light source units 720 between the light exit surface 752 of the flat light guide plate 750 and the four linear light source units 720. Each of the plurality of light exit holes 730 has a reflective surface 732 that totally reflects light incident on the linear light source units 720 into the flat light guide plate 750.

The illumination device 700 may further include a frame 740 covering and protecting the linear light source units 720, the LEDs 710, and the plurality of light exit holes 730. The frame 740 may have a rectangular frame shape to cover all the four linear light source units 720 formed on the four sides of the flat light guide plate 750.

Since the linear light source units 620 and 720 are respectively formed on the two and four sides of the flat light guide plates 650 and 750, the illumination devices 600 and 700 of FIGS. 12 and 13 can improve the brightness of light emitted through the light exit surfaces 652 and 752 of the flat light guide plates 650 and 750.

The various modifications illustrated in FIGS. 7A through 11 can be applied to the illumination devices 600 and 700 of FIGS. 12 and 13.

Figure 14A:
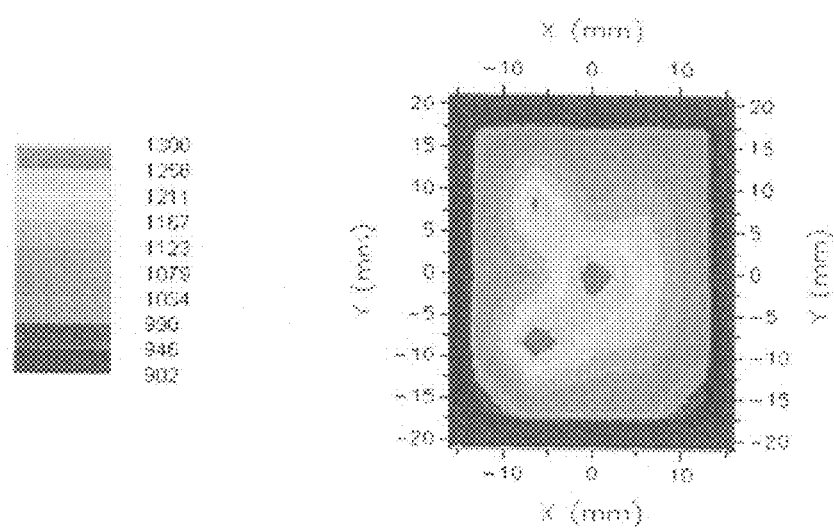
FIG. 14A is a photograph illustrating the luminance distribution of light emitted through a light exit surface of a light guide plate of the illumination device of FIG. 4.
Figure 14B:
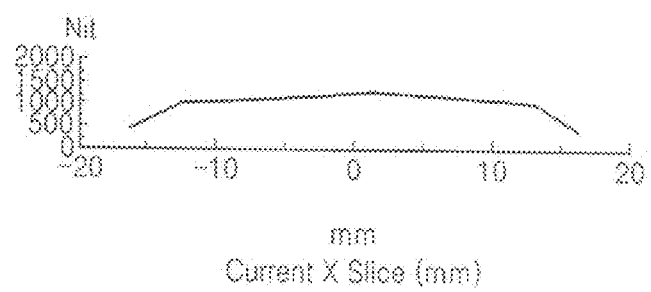
FIG. 14B is a graph illustrating luminance distribution measured along an X-axis of the photograph of FIG.
Figure 14C:
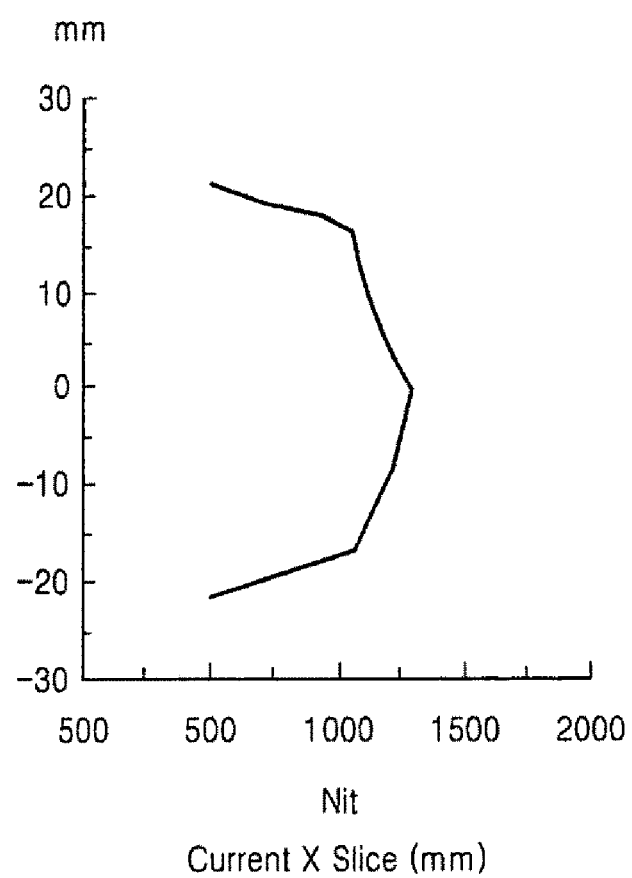
FIG. 14C is a graph illustrating luminance distribution measured along a Y-axis of the photograph of FIG. 14A.

FIG. 14A is a photograph illustrating the luminance distribution of light emitted through the light exit surface 152 of the flat light guide plate 150 of the illumination device 100 of FIG. 4. FIG. 14B is a graph illustrating luminance distribution measured along an X-axis of FIG. 14A. FIG. 14C is a graph illustrating luminance distribution measured along a Y-axis of FIG. 14A.

Referring to FIGS. 14A through 14C, the luminance distribution of light emitted through the light exit surface 152 of the flat light guide plate 150 of the illumination device 100 is more uniform than that of light in the related art illumination device. In particular, as shown in FIG. 14B, luminance uniformity measured along the X-axis near the linear light source unit 120 of the flat light guide plate 150 is much greater than that in the related art illumination device. Accordingly, dark and bright lines do not appear near the linear light source unit 120 of the illumination device 100.

As described above, the illumination device for the LCD according to exemplary embodiments of the present invention can improve luminance uniformity of light emitted through the light exit surface of the flat light guide plate and prevent dark and bright lines by integrally forming the linear light source unit, which emits linear light using the point light sources, with the flat light guide plate. Therefore, the effective area of the flat light guide plate for emitting light to the liquid crystal panel can be increased. Since the linear light source unit is integrally formed with the flat light guide plate, the illumination device can be easily manufactured as well.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An illumination device for a liquid crystal display, the illumination device comprising:
   a flat light guide plate comprising a top surface having a first portion with a light exit surface and a second portion;
   at least one linear source unit integrally formed with at least one side of the flat light guide plate and extending along the at least one side of the flat light guide plate, and including a flat surface being opposite and substantially parallel to the one side surface of the flat light guide plate;
   at least one point light source which emits light in a longitudinal direction of the linear light source unit through at least one end surface of the linear light source unit into the linear light source unit; and a plurality of light exit holes vertically passing through the second portion of the flat light guide plate and arranged in the longitudinal direction of the linear light source unit between the light exit surface of the flat light guide plate and the linear light source unit, wherein each of the light exit holes has a reflective surface that reflects light incident on the linear light source unit into the first portion of the flat light guide plate.

2. The illumination device of claim 1, wherein the point light sources are light-emitting diodes.

3. The illumination device of claim 1, wherein the at least one point light source comprises a first point light source which emits light through a first side surface of the linear light source unit and a second point light source which emits light through a second side surface of the linear light source unit.

4. The illumination device of claim 1, wherein each of the at least one point light source is tilted at a predetermined angle with respect to a longitudinal axis of the linear light source unit.

5. The illumination device of claim 1, wherein each of the at least one point light source has a thickness greater than that of the linear light source unit, and the illumination device further comprises a coupling which tapers from each of the at least one point light source to the linear light source unit, disposed between each of the at least one point light source and the linear light source unit.

6. The illumination device of claim 1, wherein the reflective surface of each of the plurality of light exit holes is inclined at a predetermined angle.

7. The illumination device of claim 1, wherein the reflective surface of each of the plurality of light exit holes is curved.

8. The illumination device of claim 1, wherein each of the plurality of light exit holes has a triangular shape.

9. The illumination device of claim 1, wherein each of the plurality of light exit holes has a trapezoidal shape.

10. The illumination device of claim 1, wherein any one selected from the group consisting of a prism pattern, a lens pattern, a scattering pattern, and a diffraction grating pattern is disposed on a side surface of the linear light source unit facing the plurality of light exit holes.

11. The illumination device of claim 10, wherein the prism pattern comprises a plurality of prisms extending in one of the longitudinal direction and a thickness direction of the linear light source unit.

12. The illumination device of claim 10, wherein the lens pattern comprises a plurality of lenses extending in one of the longitudinal direction and a thickness direction of the linear light source unit.

13. The illumination device of claim 1, further comprising a frame which covers and protects the linear light source unit, the point light sources, and the plurality of light exit holes.

14. The illumination device of claim 13, wherein the frame comprises an inner reflective surface that reflects light leaking from the linear light source unit back into the linear light source unit.

15. The illumination device of claim 14, wherein the frame further comprises any one selected from the group consisting of a prism pattern, a lens pattern, a scattering pattern, and a diffraction grating pattern disposed on the inner reflective surface of the frame.

16. The illumination device of claim 15, wherein the prism pattern comprises a plurality of prisms extending in one of the longitudinal direction and a thickness direction of the linear light source unit.

17. The illumination device of claim 15, wherein the lens pattern comprises a plurality of lenses extending in one of the longitudinal direction and a thickness direction of the linear light source unit.

18. The illumination device of claim 1, further comprising optical path changing means which changes the traveling path of light incident from the linear light source unit and emits the light through the light exit surface, disposed on the flat light guide plate.

19. The illumination device of claim 18, wherein the optical path changing means is any one selected from the group consisting of a dot print pattern, a hologram pattern, a reverse prism pattern, and a reverse trapezoidal pattern.

20. The illumination device of claim 1, wherein the at least one linear source unit comprises two linear light source units disposed on two opposite sides of four sides of the flat light guide plate.

21. The illumination device of claim 1, wherein the at least one linear source unit comprises four linear light source units disposed on four sides of the flat light guide plate.

* * * * *